March 20, 1956    J. L. KAMENJAR ET AL    2,739,036
AMMONIUM NITRATE PRILL
Filed Aug. 25, 1952
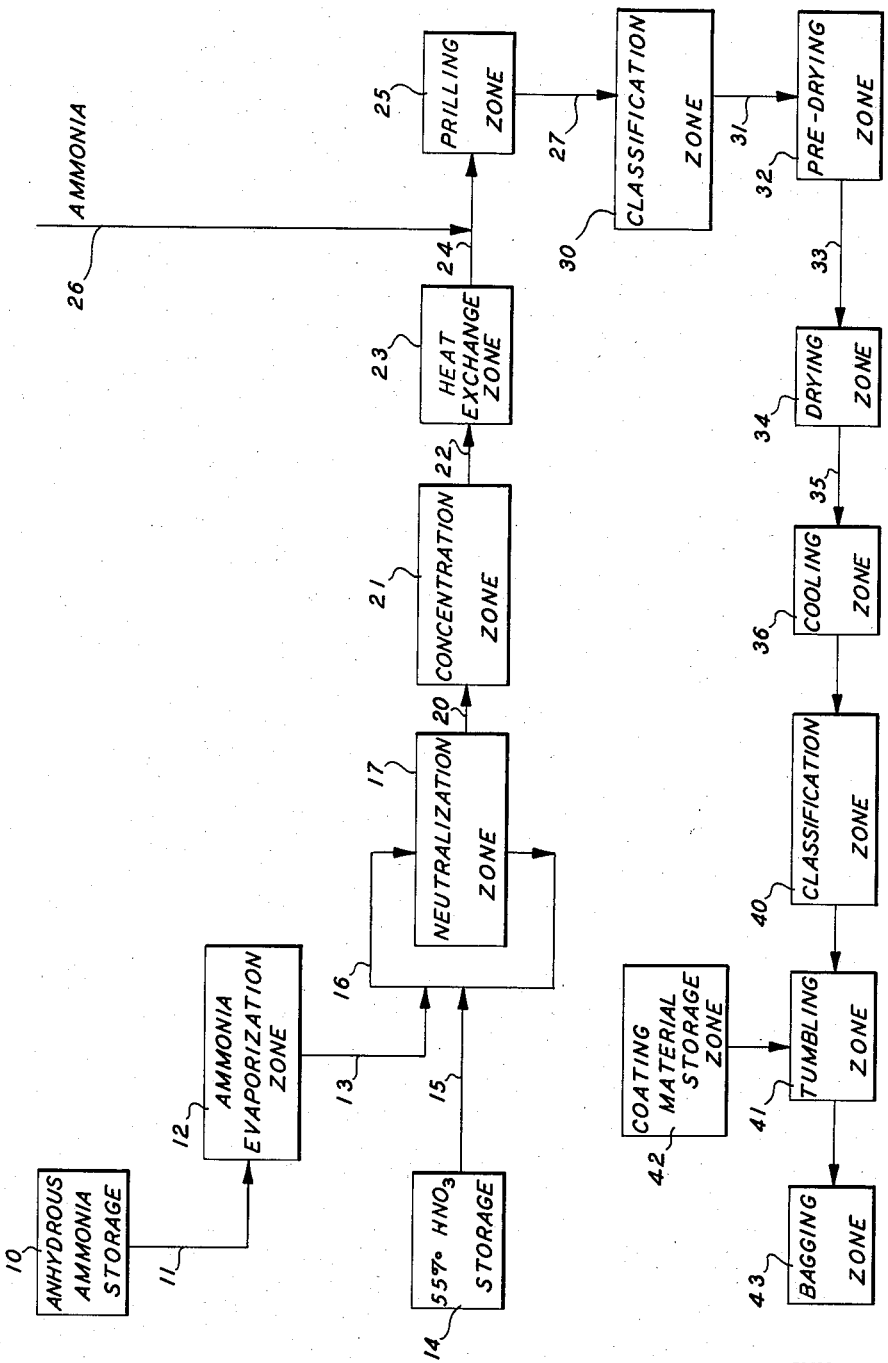
INVENTORS.
J. L. KAMENJAR
H. R. ANTLE
BY
*Hudson & Young*
ATTORNEYS ial No. 306,082

9 Claims. (Cl. 23—103)

This invention relates to an improved process for the production of granular ammonium nitrate. In one of its aspects this invention relates to an improvement in the process for the production of granular ammonium nitrate fertilizer. In another one of its aspects this invention relates to an improved ammonium nitrate prill.

Ammonium nitrate has particularly desirable chemical properties for use as a fertilizer in that the nitrogen content is high and the salt is highly soluble. However, due to a tendency of the salt particles to merge together and form a hard, dense cake when stored, its use for fertilizer has been restricted. To help alleviate part of this problem, there was recently developed a process for producing a granular ammonium nitrate in which the granules are free flowing, strong, dense and hard and which are of a relative uniform size as well as having a reduced tendency to cake and harden when stored for long periods of time. This process has come to be known as "prilling" and is described in U. S. Patent 2,402,192 to Williams et al.

We have now found that an ammonium nitrate prill can be produced which has still greater hardness and density and is more easily dried.

It is therefore an object of this invention to provide an improved process for the production of granular ammonium nitrate.

It is another object of this invention to provide an improvement in a process for the production of granular ammonium nitrate fertilizer.

A further object of this invention is to provide an ammonium nitrate prill characterized by increased hardness and density and being more easily dried.

Further and additional objects will be apparent upon reading the accompanying disclosure and drawing.

The accompanying drawing is a flow sheet illustrating the several steps of the process for producing granular ammonium nitrate fertilizer.

In general, ammonium nitrate is produced by reacting ammonia with nitric acid to produce a solution of ammonium nitrate. When employing the granulation process of Williams et al., hereinbefore cited, this solution must be concentrated to approximately 95 weight per cent. The concentrated solution is then passed at a temperature above its saturation temperature to a prilling tower where it is sprayed against an upwardly moving volume of cooled air. The liquid particles of ammonium nitrate falling down the tower are chilled to form granules of ammonium nitrate containing no more than 4 weight per cent moisture. The ammonium nitrate prills fall to the bottom of the tower and are recovered therefrom. The prills can then be dried, cooled, screened and coated with an argillaceous material to prevent absorption of moisture. A finished fertilizer product can then be bagged and/or conveyed to storage or shipment.

We have surprisingly found that if a minor amount of ammonia is added to the stream of 95 per cent solution being fed to the prilling tower an ammonium nitrate prill of improved hardness, density and dryability is produced. In operating our invention on a commercial basis we have found the advantages to be extremely significant. The increase in hardness results in less fines and cuts down on the amount of recycle treatment. The improved drying characteristic makes it possible to decrease the residence time in the dryer thus allowing a greater throughput of material.

Referring now to the drawing, illustrated is a flow sheet of one embodiment of my invention wherein an improved ammonium nitrate fertilizer is produced. Ammonium nitrate is produced by the reaction between ammonia and nitric acid according to the chemical equation:

$$NH_{3(g)} + HNO_{3(Aq)} \rightarrow NH_4NO_{3(Aq)} + Heat$$

Anhydrous liquid ammonia from storage zone 10 is passed via line 11 to ammonia evaporating zone 12 where it is vaporized and is admixed via line 13 with the proper stoichiometric amount of 55 weight per cent nitric acid from acid storage zone 14 passing through line 15 in line 16 which contains a circulating stream of liquid from neutralization zone 17. For a production of 300 tons per day of commercial ammonium nitrate, 54.6 gallons per minute of 55 per cent aqueous nitric acid and 91.4 pounds per minute of ammonia will be required. This amounts to 670 cubic feet per minute ammonia gas at 46° C. and 35 p. s. i. g. In neutralization zone 17 a solution of ammonium nitrate of approximately 75 weight per cent ammonium nitrate is produced, concentration of the solution being effected by evaporation of water using the heat of reaction. A temperature of approximately 175° C. and a pressure of about 35 p. s. i. a. are preferably maintained in zone 17. To assure complete neutralization and to avoid excess nitric acid which tends to cause decomposition in the finished product, it is desirable to maintain a small free ammonia condition in the reaction mixture in zone 17. The condition of the reaction mixture can be determined by measuring the pH of the condensed steam leaving the zone. The pH of said condensed steam is preferably as close to 10 as possible. A 75 per cent ammonium nitrate solution leaves zone 17 through line 20 and passes to concentration zone 21 where it is concentrated, by evaporation of water to about 95 weight per cent. A concentration range of about 94 to 97 per cent is tenable for proper operation in the prilling tower. However, the concentration should be controlled with great care since if a less concentrated solution is used the moisture cannot readily be extracted from the cores of the prills without causing deterioration of the shells formed in the spraying step, while prills formed from a more highly concentrated solution contain a large central void which makes them less satisfactory as a fertilizer due to their lower crushing strength. Reduced pressure of the order of about 5.8 pounds per square inch absolute and a temperature of about 135° C. are maintained in concentration zone 21. Due to the high temperature and/or low pressure conditions which usually must prevail for economic concentration, the resulting solution of ammonium nitrate recovered from concentration zone 21 is neutral, or sometimes slightly acidic if conditions become too severe. Under ordinary operating procedure this neutral solution is passed via line 22 to heat exchange zone 23 where it is heated to about 140° C. or to a temperature suitably above its saturation temperature and then passed via line 24 to prilling zone 25, under sufficient pressure to provide a pressure of the order of about 10 p. s. i. g. at the spray nozzles. This pressure is purposely small to avoid undue dispersion of the ammonium nitrate into small droplets. According to our invention a minor amount of ammonia, preferably from 0.005 to 0.01 weight per cent based on the aqueous ammonium nitrate solution, is added via line 26 to the hot 95 per cent solution of ammonium nitrate just prior to passing it to prilling zone 25. The ammonia can be added in the liquid anhydrous form, gaseous form or aqueous form, the first-mentioned being the most preferred form and the last-mentioned the least preferred form. The amount of ammonia added should be sufficient to put the concentrated solution slightly on the alkaline side. As hereinbefore stated, by operating according to our invention an ammonium nitrate prill of increased hardness and density and improved dryability is produced. The presence of ammonia during the prilling causes the ammonium nitrate to crystallize in a smaller crystal thereby helping to impart the aforementioned improved properties to the prill.

In the prilling operation the 95 per cent ammonium nitrate solution containing the added ammonia is filtered to remove all traces of solid impurities and to avoid blockage of the spray nozzles. Two sets of spray nozzles located at the top of the zone face each other and eject ammonium nitrate solution upward and toward each other at an angle of 60 to 70 degrees. As the droplets of solution fall through the zone they are met by a large volume of air at about 20° C. countercurrently. The relatively cold air "chills" the droplets to form granules or "prills" of ammonium nitrate before they reach the bottom of the tower. In addition, the air reduces the moisture content from 5 per cent to 4 per cent in the crystals and removes the heat of crystallization liberated upon the formation of the granules. The granules, containing approximately 4 per cent moisture and a temperature at about 75° C., drop to the bottom of the zone where they pass through an 8 inch mesh screen. The granules at the bottom are conveyed via line 27 to classification zone 20 where 98 to 100% pass through #8 sieve and then pass via line 31 to pre-drying zone 32, entering at about 75° C. and 4 per cent moisture and leaving at about 65° C. and about 2.75 per cent moisture. Hot dry air is used as the drying agent. The prills leaving zone 32 via line 33 enter drying zone 34 and leave same at about 80° C. and about 0.5 per cent moisture. Entering cooling zone 36 via line 35 the dried prills are cooled to about 40° C. and the moisture content reduced to about 0.3 per cent. Air is used as the drying and cooling agent in zones 34 and 36, respectively. The dried ammonium nitrate prills are further screened in classification zone 40 and conveyed to tumbling zone 41 where they are coated with an argillaceous material, such as clay or diatomaceous earth, from coating material storage zone 42 to prevent absorption of moisture upon storage. The coated ammonium nitrate prills, a finished fertilizer product, are then weighed and bagged in bagging zone 43 from whence they are conveyed to shipment or storage.

As an example of the improved results obtained when operating in accordance with our invention, prills produced in the normal manner contained from 3.8 to 4.2 weight per cent water while prills produced with ammonia injection in accordance with our invention contained 2.7 weight per cent water. Thus, a substantial improvement in the dryability of the prill is indicated.

While this invention has been described and exemplified in terms of its preferred embodiment, those skilled in the art will readily appreciate that modifications can be made without departing from the spirit and scope of our invention.

We claim:

1. In a process for the production of granular ammonium nitrate wherein ammonia is reacted with nitric acid to produce a solution of ammonium nitrate, the thus-produced solution concentrated to within the range of 94 to 97 weight per cent, the thus-concentrated solution passed to a prilling zone, and granular ammonium nitrate recovered therefrom, the improvement which comprises adding a minor amount of ammonia to the thus concentrated solution after concentration and before passing same to the prilling zone.

2. In a process for the production of granular ammonium nitrate wherein gaseous ammonia is admixed with about 55 weight per cent nitric acid to produce a solution containing approximately 75 weight per cent ammonium nitrate, said solution concentrated to within the range of 94 to 97 weight per cent, the thus-concentrated solution passed to a prilling zone and granular ammonium nitrate recovered therefrom, the improvement which comprises adding from 0.005 to 0.01 weight per cent of ammonia to the concentrated solution after concentration and before passing same to the prilling zone.

3. In a process for the production of granular ammonium nitrate fertilizer wherein ammonia is reacted with nitric acid to produce a solution of ammonium nitrate, the thus-produced solution concentrated to within the range of 94 to 97 weight per cent, the thus-concentrated solution passed to a prilling zone to produce a granular ammonium nitrate, the thus-produced granular ammonium nitrate classified, dried, cooled and coated with an argillaceous material, the improvement which comprises adding a minor amount of ammonia to the concentrated solution after concentration and before passing same to the prilling zone.

4. In a process for the production of granular ammonium nitrate fertilizer wherein gaseous ammonia is admixed with concentrated nitric acid to produce a solution containing approximately 75 weight per cent ammonium nitrate, the thus produced solution concentrated to within the range of 94 to 97 weight per cent, the thus-concentrated solution passed to a prilling zone to produce a granular ammonium nitrate, the thus-produced granular ammonium nitrate classified, dryed, cooled and coated with an argillaceous material, the improvement which comprises adding from 0.005 to 0.01 weight per cent of ammonia to the concentrated solution after concentration and before passage to said prilling zone.

5. In a process for the production of granular ammonium nitrate wherein an aqueous solution of ammonium nitrate is concentrated to within the range of 94 to 97 weight per cent, the thus-concentrated solution passed to a prilling zone and a granular product recovered therefrom, the improvement which comprises adding a minor amount of ammonia to said concentrated solution after concentration but before passage to the prilling zone.

6. The improvement according to claim 5 wherein from 0.005 to 0.01 weight per cent ammonia is added to said concentrated ammonium nitrate solution.

7. The product of the process of claim 2.

8. The product of the process of claim 3.

9. The product of the process of claim 5.

References Cited in the file of this patent
UNITED STATES PATENTS

| | | |
|---|---|---|
| 1,036,896 | Peacock | Aug. 27, 1912 |
| 1,924,041 | Johnson | Aug. 22, 1933 |
| 1,999,026 | Tramm et al. | Apr. 23, 1935 |
| 2,102,136 | Shapleigh | Dec. 14, 1937 |
| 2,115,851 | Handforth et al. | May 3, 1938 |
| 2,167,464 | Rogers et al. | July 25, 1939 |
| 2,307,253 | Yee et al. | Jan. 5, 1943 |
| 2,402,192 | Williams et al. | June 18, 1946 |